June 24, 1930.　　　　M. E. HILL　　　　1,766,634
TIRE CHAIN CARRIER FOR MOTOR VEHICLES
Filed March 22, 1928　　　2 Sheets-Sheet 1
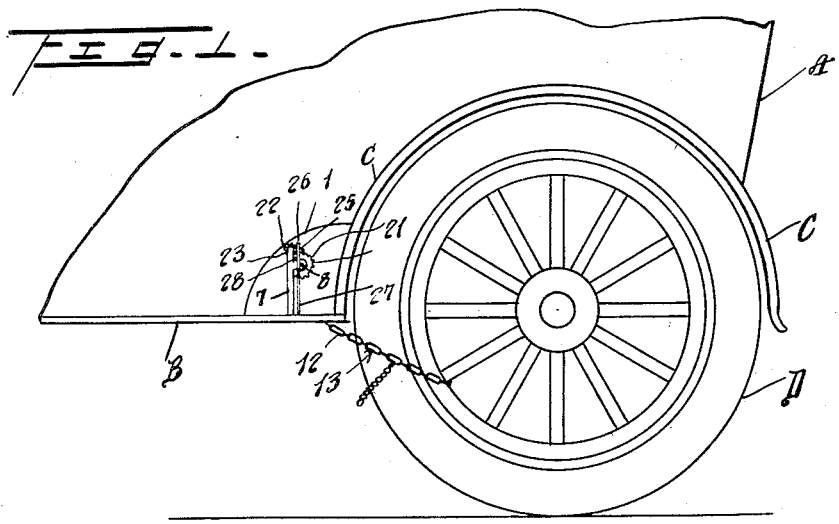
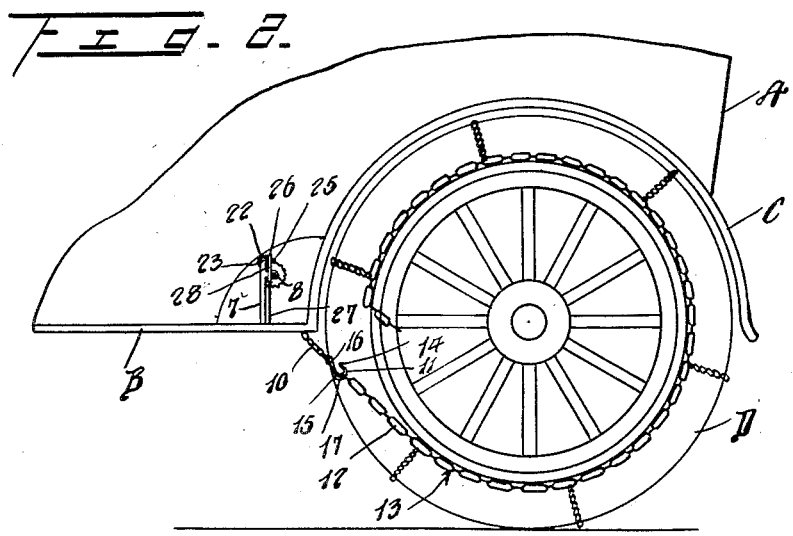
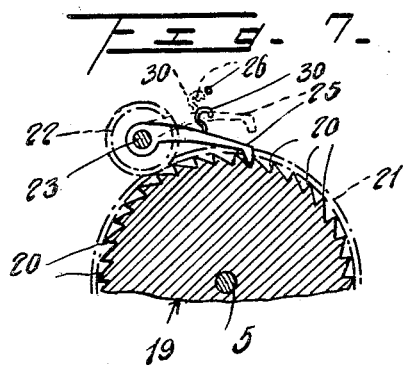
Inventor
M.E.Hill
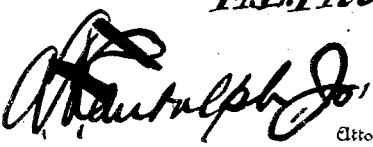
Attorney June 24, 1930. M. E. HILL 1,766,634
TIRE CHAIN CARRIER FOR MOTOR VEHICLES
Filed March 22, 1928 2 Sheets-Sheet 2
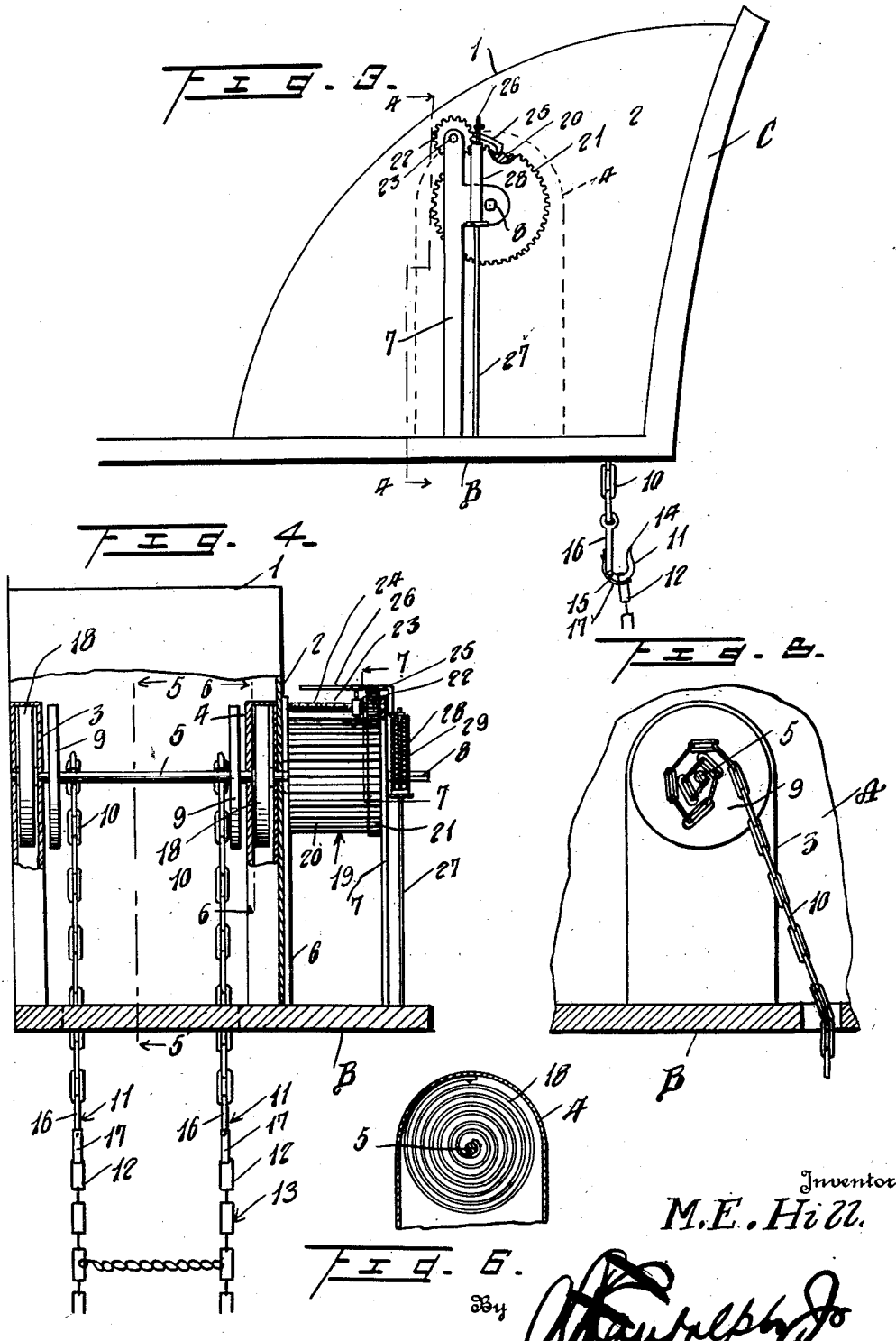
Inventor
M.E.Hill.
By
Attorney Patented June 24, 1930

1,766,634

UNITED STATES PATENT OFFICE

MAMIE E. HILL, OF WALDEN, COLORADO

TIRE-CHAIN CARRIER FOR MOTOR VEHICLES

Application filed March 22, 1928. Serial No. 263,703.

The invention relates to an attachment for motor vehicles to enable carrying the tire chains used for the driving wheels of motor vehicles for traction in snow, mud, etc., and also for preventing skidding, and has for its object the provision of means enclosed within a suitable housing on which the tire chains are adapted to be wound, and providing a spring motor for winding the chains, said spring motor being tensioned by the unwinding of the chain from the attachment when placing it on the wheel, means being provided to hold the spring motor under tension, said means being adapted to be actuated to release the winding mechanism to action of the spring motor and to automatically stop the winding when the chain is entirely wound.

The invention will be described in detail hereinafter and will be found illustrated in the accompanying drawings, in which Figure 1 is a side view in elevation of a rear fragment of a motor vehicle showing the driving wheel with a chain attached thereto preliminary to winding it on the wheel, Figure 2 is a similar view showing the chain applied to the wheel, Figure 3 is a view of an enlarged scale of the attachment shown partly broken away, Figure 4 is a transverse sectional view on a plane indicated by the line 4—4 of Figure 3, and Figures 5, 6, and 7 sectional details on the planes indicated by the lines 5—5, 6—6 and 7—7 of Figure 4.

In the drawings similar reference characters are used to designate corresponding parts throughout the several views.

The body of an automobile is indicated at A and has a running board B, the rear fender C, and the driving wheel D. The attachment comprises a housing utilizing the running board B and the fender C for walls and as shown in the drawings the wall connecting the running board B and fender C thus forming the top wall of the housing 1 is curved. The body of the vehicle forms the rear wall of the housing and 2 indicates the front wall. 3 and 4 indicate housings within the attachment and 5 a shaft journaled in said housings extending outside of the wall 2 and having its extended end journaled on uprights 6 and 7 supported on the running board B and the extremity of the shaft 5 formed with a polygonal end 8 for turning the shaft by means of a crank or wrench. Secured to the shaft 5 are spaced disks 9 forming the side plates of a reel, and secured to the shaft intermediate of the disks 9 are chains 10 having hooks 11 to engage the ends of the side chains 12 of the tire chain 13. The bills 14 of the hooks 11 are pivotally engaged as shown at 15 with the shanks 16 of the hooks to permit automatic releasing of the side chains 12 from the hooks in applying the chain on the wheels, as will be hereinafter described, the bills of the hooks 14 being held in engaging position by means of springs 17.

18 designates helical springs that are secured at one end to the shaft 5 and at their other ends to the housings 3 and 4, respectively, and tensioned to normally rotate the shaft to wind the chains 10 and 13 on the shaft 5.

Secured to the shaft 5 between the upright members 6 and 7 is a drum 19 having the major portion of its surface formed as ratchets with teeth 20 and at the outer end of the drum formed with gear teeth 21. 22 is a pinion secured to shaft 23 and meshing with the gear teeth 21, the shaft 23 being journaled in the upright members 6 and 7 and is provided with screw threads 24 extending the length of the shaft from the gear pinion 22 to the upright 6. 25 indicates a gravity pawl engaging the gear teeth 20 and by so doing holding the shaft 5 from rotation by the springs 18, said pawl 25 threadedly engaging the shaft 23 so that during rotation of the shaft 5 said pawl is actuated longitudinally of the shaft 23 by the threaded engagement. When chains 10 and 13 are fully wound on shaft 5, pawl 25 is located adjacent to upright 6 and engages the ratchet drum 19 to prevent further winding of the shaft by tension of springs 18. When the shaft, as shown in Figure 5, is rotated in a clockwise direction by unwinding the chains 10 and 13 therefrom the pawl 25 will be moved away from upright 6 to the position shown in Figure 4, the pawl riding over the teeth 20, and when the chain 10 is fully unwound the pawl, by engagement with the teeth 20 will hold the shaft from rewinding and the springs 18 under tension. When the shaft 5 is rotated in the opposite direction to wind the chains on the shaft under the impulse of the springs 18 the pawl will move from the extremity of the shaft adjacent to the pinion 22 towards the upright 6. As obviously the drum 19 will not rotate in the direction to wind the chains under the impulse of the spring motors 18 when the pawl 25 is in engagement with the teeth 20, provision is made for holding the pawl from engagement with the teeth consisting of an arm 26 slidably mounted on rod 27 and providing a spring housing 28 secured to arm 26 and slidably enclosing the upper end of said rod 27 in which is housed a spring 29 having its lower end secured to the rod 27 and its upper end engaging the upper end of the housing 28 to normally move the arm 26 upwardly to permit depression of said arm; and the pawl 25 is provided with a hook 30 to engage the arm, as shown in broken lines in Figure 7, so that by pushing down on the arm 26 against the tension of spring 29 the arm may be engaged with the hook 30, and when pressure on the arm is released spring 29 will react to lift the arm and hold the pawl 25 out of engagement with the ratchet teeth 20 during the winding operation of the chains. The arm 26 is ended short of the shaft 23 so that when the pawl has been actuated to the end of the shaft 23 where journaled in uprights 6, it will drop off of the arm 26 into engagement with the ratchet and will hold the spring motors 18 under tension with the chains wound on the shaft 5. In Figure 1 the tire chain is shown in the position to begin the operation of mounting the chain on the tire, the ends of the side chains 12, which carry the hooks for connecting the ends of the side chains being engaged around one of the spokes of the wheel B. By moving the vehicle forward under its own power, or by rotating the wheel when raised, it will be apparent that the chain will be mounted on the wheel in the position shown in Figure 2. During the operation of unwinding the chain the pawl 25 that at the beginning of the unwinding operation, is at the end of the shaft 23, remote from the pinion 22, will be actuated by the threaded shaft 23 towards the pinion 22.

When it is desired to remove the chain and wind it on the shaft 5 the ends of the side chains 12 are connected with the hooks 11 and the arm 26 is then depressed, as heretofore stated, to engage hook 30 and raise the pawl 25 thus releasing the shaft to actuation by the spring motors 18. During the rotation of the shaft 5 the drum 19 will be actuated and with it the threaded shaft 23 to move the pawl away from the position shown in Figure 4 to the other end of the shaft and when it reaches the end of the arm 26 the pawl 25 will drop into engagement with the ratchet teeth 20 and hold the chain wound on the shaft by the tension of springs 18.

What is claimed is:—

1. A tire chain carrier for vehicles, comprising a shaft suitably journaled and adapted to wind a tire chain thereon, a spring motor to rotate the shaft to wind the chain, a ratchet drum secured for rotation with the shaft, a screw shaft actuated by the drum, a pawl threadedly engaging said screw shaft and movable longitudinally of the drum during rotation, said pawl by engaging the drum adapted to prevent rotation of the shaft by the spring motor, and means to hold the pawl from engagement with the drum during winding rotation of the shaft, said means automatically permitting engagement of the pawl with the drum at the completion of said winding rotation.

2. A tire chain carrier for vehicles, comprising a shaft suitably journaled and adapted to wind a tire chain thereon, a spring motor to rotate the shaft to wind the chain, a drum secured for rotation with the shaft, said drum having a ratchet face and a gear face, a pawl engaging said ratchet face to hold the shaft from rotation by said spring motor, a screw shaft threadedly engaging and pivoting the pawl, a pinion secured to said screw shaft and meshing with said gear face, and an arm engageable with the pawl to hold it from engagement with the drum during winding rotation of the shaft.

3. A tire chain carrier for vehicles, comprising a shaft suitably journaled and adapted to wind a tire chain thereon, a spring motor to rotate the shaft and wind the chain, a ratchet drum secured for rotation with the shaft, a pawl engaging said drum to hold the shaft from rotation by the spring motor, and means to hold the pawl from engagement with the drum during winding rotation of the shaft, said means automatically permitting engagement of the pawl with the drum at the completion of the winding rotation of the shaft.

4. A tire chain carrier for vehicles, comprising a shaft suitably journaled and adapted to wind a tire chain thereon, a spring motor to rotate the shaft to wind the chain, a ratchet drum secured for rotation with the shaft, a pawl engaging the drum to hold the shaft from rotation by the spring motor, means to hold the pawl from engagement with the drum during winding rotation of the shaft, and means to move the pawl longitudinally of the drum during said winding rotation of the shaft, said first means automatically permitting engagement of the pawl with the drum at the completion of said winding rotation.

In testimony whereof I affix my signature.

MAMIE E. HILL.